United States Patent
Bacon et al.

(10) Patent No.: US 12,390,837 B1
(45) Date of Patent: Aug. 19, 2025

(54) MACHINE-ASSISTED INSPECTION OF SEALABLE BAGS

(71) Applicants: Aaron Thomas Bacon, Garden Grove, CA (US); Aerick William Bacon, Garden Grove, CA (US); Thomas Dell Bacon, Garden Grove, CA (US)

(72) Inventors: Aaron Thomas Bacon, Garden Grove, CA (US); Aerick William Bacon, Garden Grove, CA (US); Thomas Dell Bacon, Garden Grove, CA (US)

( * ) Notice: Subject to any disclaimer, the term of this patent is extended or adjusted under 35 U.S.C. 154(b) by 0 days.

(21) Appl. No.: 18/419,343

(22) Filed: Jan. 22, 2024

Related U.S. Application Data

(60) Provisional application No. 63/444,813, filed on Feb. 10, 2023.

(51) Int. Cl.
*B07C 5/34* (2006.01)
*G06T 7/00* (2017.01)

(52) U.S. Cl.
CPC .......... *B07C 5/3404* (2013.01); *G06T 7/0004* (2013.01); *G06T 2207/10028* (2013.01); *G06T 2207/20061* (2013.01); *G06T 2207/20081* (2013.01); *G06T 2207/20084* (2013.01)

(58) Field of Classification Search
CPC ................ B07C 5/3404; G06T 7/0004; G06T 2207/10028; G06T 2207/20061; G06T 2207/20081; G06T 2207/20084
See application file for complete search history.

(56) References Cited

U.S. PATENT DOCUMENTS

| | | | |
|---|---|---|---|
| 5,515,159 A | 5/1996 | Sites et al. | G01N 21/95 |
| 5,896,195 A | 4/1999 | Juvinall et al. | G01N 21/00 |
| 6,256,095 B1 | 7/2001 | Ringlien | G01N 21/90 |
| 6,621,569 B2 | 9/2003 | Sones | G01N 21/88 |
| 7,036,287 B1 | 5/2006 | Webb | B65B 57/04 |
| 7,272,916 B2 | 9/2007 | Webb | B65B 57/04 |
| 7,434,986 B2 | 10/2008 | Ignatowicz | G01N 25/00 |
| 7,464,518 B2 | 12/2008 | Ansinn | B65B 57/18 |
| 7,673,498 B2 | 3/2010 | De Baerdemaeker | G01M 3/00 |
| 9,037,421 B2 | 5/2015 | Jones et al. | G01M 3/34 |

(Continued)

OTHER PUBLICATIONS

Keyence, 2D/3D Laser Profiler LJ-X8000 series, Oct. 26, 2022, https://web.archive.org/web/20221026030535/https://www.keyence.com/products/measure/laser-2d/lj-x8000/ (Year: 2022).*

*Primary Examiner* — Jacob S. Scott
*Assistant Examiner* — Miraj T. Patel
(74) *Attorney, Agent, or Firm* — Venable LLP

(57) ABSTRACT

A machine-assisted determination of whether a sealable bag is or is not properly sealed, wherein a surface or surfaces of the sealable bag is contactlessly scanned as the sealable bag is conveyed past an inspection station so as to obtain a depth map describing a surface profile topology of the scanned surface. The depth map of the scanned surface of the sealable bag is provided to the input layer of a trained neural network so as to obtain a classification output from the neural network signifying whether the seal on the sealable bag is or is not intact. The sealable bag is sorted to a discard station responsive to a classification output that signifies that the seal on the sealable bag is not intact and is sorted to a packaging station responsive to a classification output that signifies that the seal on the sealable bag is intact.

22 Claims, 15 Drawing Sheets

(56) References Cited

U.S. PATENT DOCUMENTS

| | | | | |
|---|---|---|---|---|
| 9,233,768 | B2 | 1/2016 | Meskens et al. | B65B 9/04 |
| 9,367,765 | B2 | 6/2016 | Duckett | G06T 7/00 |
| 9,612,216 | B2 | 4/2017 | Taylor | B29C 65/18 |
| 9,791,395 | B2 | 10/2017 | Weinstein et al. | G01N 25/72 |
| 9,927,372 | B2 | 3/2018 | Niemela et al. | G01N 21/90 |
| 10,648,923 | B2 | 5/2020 | Bonardi et al. | G01N 21/90 |
| 10,895,516 | B2 | 1/2021 | Chisholm et al. | G06K 9/00 |
| 11,189,058 | B2 | 11/2021 | Kubo | G06T 11/00 |
| 11,237,118 | B2 | 2/2022 | Weinstein et al. | H04N 7/18 |
| 11,244,439 | B2 | 2/2022 | Bommarito et al. | G06T 7/00 |
| 11,321,823 | B2 | 5/2022 | Weinstein et al. | G06T 7/00 |
| 11,373,290 | B1 | 6/2022 | Johannesson et al. | G06T 7/00 |
| 2007/0237201 | A1 | 10/2007 | Ignatowicz | G01N 25/00 |
| 2010/0018941 | A1 | 1/2010 | Kerr et al. | G01M 3/38 |
| 2021/0004577 | A1* | 1/2021 | Amat Roldan | A01K 29/00 |
| 2021/0035278 | A1 | 2/2021 | Jo et al. | G06T 7/00 |
| 2021/0049396 | A1 | 2/2021 | Radmer | G06K 9/32 |
| 2021/0201471 | A1* | 7/2021 | Sreeram | G06F 18/2411 |
| 2021/0331823 | A1 | 10/2021 | Hallstadius et al. | B65B 27/00 |
| 2021/0390675 | A1 | 12/2021 | Noda | G06T 7/00 |
| 2022/0016853 | A1 | 1/2022 | Lakhani et al. | B29C 65/00 |
| 2022/0214243 | A1 | 7/2022 | Li et al. | G01M 3/38 |
| 2022/0222809 | A1 | 7/2022 | Weinstein et al. | G06T 7/00 |
| 2022/0318985 | A1 | 10/2022 | Nakagawa | G06T 7/00 |
| 2023/0343069 | A1* | 10/2023 | Welwitigoda | G06T 7/0004 |

* cited by examiner

MACHINE-ASSISTED INSPECTION OF SEALABLE BAGS

CROSS-REFERENCE TO RELATED APPLICATIONS

This application claims benefit of priority from U.S. Provisional Application No. 63/444,813 filed Feb. 10, 2023, the content of which is incorporated by reference as if set forth herein in full.

BACKGROUND

1. Technical Field

The field generally relates to automated systems for inspecting and testing the integrity of the seal on a sealable bag.

2. Discussion of Related Art

Currently, the determination of whether a sealable bag is properly sealed for airtightness, and the subsequent sorting and packing of the sealable bag, is a labor-intensive process with inherent inefficiencies.

SUMMARY

According to certain aspects described herein, a machine-assisted determination of whether a sealable bag is or is not properly sealed involves contactlessly scanning of a surface or surfaces of the sealable bag (upper or lower surface or both and/or side surfaces) as the sealable bag is conveyed past an inspection station so as to obtain a depth map describing a surface profile topology of the scanned surface. The depth map of the scanned surface of the sealable bag is provided to the input layer of a trained neural network so as to obtain a classification output from the neural network signifying whether the seal on the sealable bag is or is not intact. A sorting mechanism is controlled to sort the sealable bag to a discard station responsive to a classification output that signifies that the seal on the sealable bag is not intact.

As used herein, "machine-assisted" refers to machine-based artificial intelligence, including neural networks and the like.

In some aspects, the input layer of the neural network may be configured to accept an additional feature vector derived from the depth map describing the surface profile topology of the scanned surface of the sealable bag, and the additional feature vector is calculated from the depth map of the scanned surface of the sealable bag and provided to the input layer of the neural network. The additional feature may be a calculated volume of the bag, a de-rotated and de-skewed portion of the seal area of the sealable bag, a line-emphasizing transformation of the seal area of the sealable bag such as a Hough transform, an image of the surface of the bag, or combinations of multiple ones of these.

In some aspects, the trained neural network may be a convolutional neural network having hidden layers in the form of a cascaded sequence of feature maps. The trained neural network may be trained on labelled depth maps of plural scanned bags and may further be trained on geometrical manipulations of the labelled depth maps so as to simulate rotational and scale variations of the labelled depth maps. The trained neural network may be trained for abnormality detection including one or both of novelty detection and outlier detection.

Further objectives and advantages will become apparent from a consideration of the description, drawings, and examples.

DETAILED DESCRIPTION

Some embodiments of the current disclosure herein are discussed in detail below. In describing embodiments, specific terminology is employed for the sake of clarity. However, the disclosure herein is not intended to be limited to the specific terminology so selected. A person skilled in the relevant art will recognize that other equivalent components can be employed, and other methods developed, without departing from the broad concepts of the current disclosure herein. Any reference cited anywhere in this specification, including the Background and Detailed Description sections, is incorporated by reference in its entirety.

In general, embodiments of the disclosure involve a conveyor configured to convey a sealable bag past an inspection station; a surface profile scanner configured and positioned to contactlessly scan a surface of the sealable bag as the sealable bag passes through the inspection station, and to obtain a depth map describing a surface profile topology of the scanned surface; a controller including a trained neural network having an input layer configured to accept depth maps, the controller being configured to provide the depth map of the scanned surface of the sealable bag to the input layer of the neural network, and to obtain a classification output from the neural network signifying whether the seal on the sealable bag is or is not intact; and a sorting mechanism which is controlled by the controller to sort the sealable bag to a discard station responsive to a classification output that signifies that the seal on the sealable bag is not intact.

As used herein, the term "bag" or "sealable bag" (also referred to as a sachet, pouch, or pillow pack, stand up pouch, gusseted pouch, and so forth) refers to a sealable container for carrying a product, such as snack-sized bags for chips or other snacks, flexible wrapped packages, pouches, sachet, and/or pillow packs. The sealable bag might or might not be sealed, and the testing of the seal thereof is one of the aspects described herein.

It should be understood that the depth map, which is provided by contactless scanning of the surface of the sealable bag and which describes a surface profile topology of the scanned surface, is distinct from an image of the surface of the bag. An image of the bag captures the of the appearance of the surface of the bag, and might capture images of brand names and logos and the like. However, an image of the surface of the bag is a poor indicator of the surface profile and shape of the bag. As opposed to an image of the bag, a depth map defines the vertical distance (Z-direction) of multiple points on the surface of the bag relative to a reference plane. Typically, the depth map has a resolution that includes the Z-direction vertical distance of many hundreds or thousands of points on the surface of the of the bag. A depth map thus provides a robust indicator of the surface profile and shape of the bag.

Apparatus

Figure 1A:
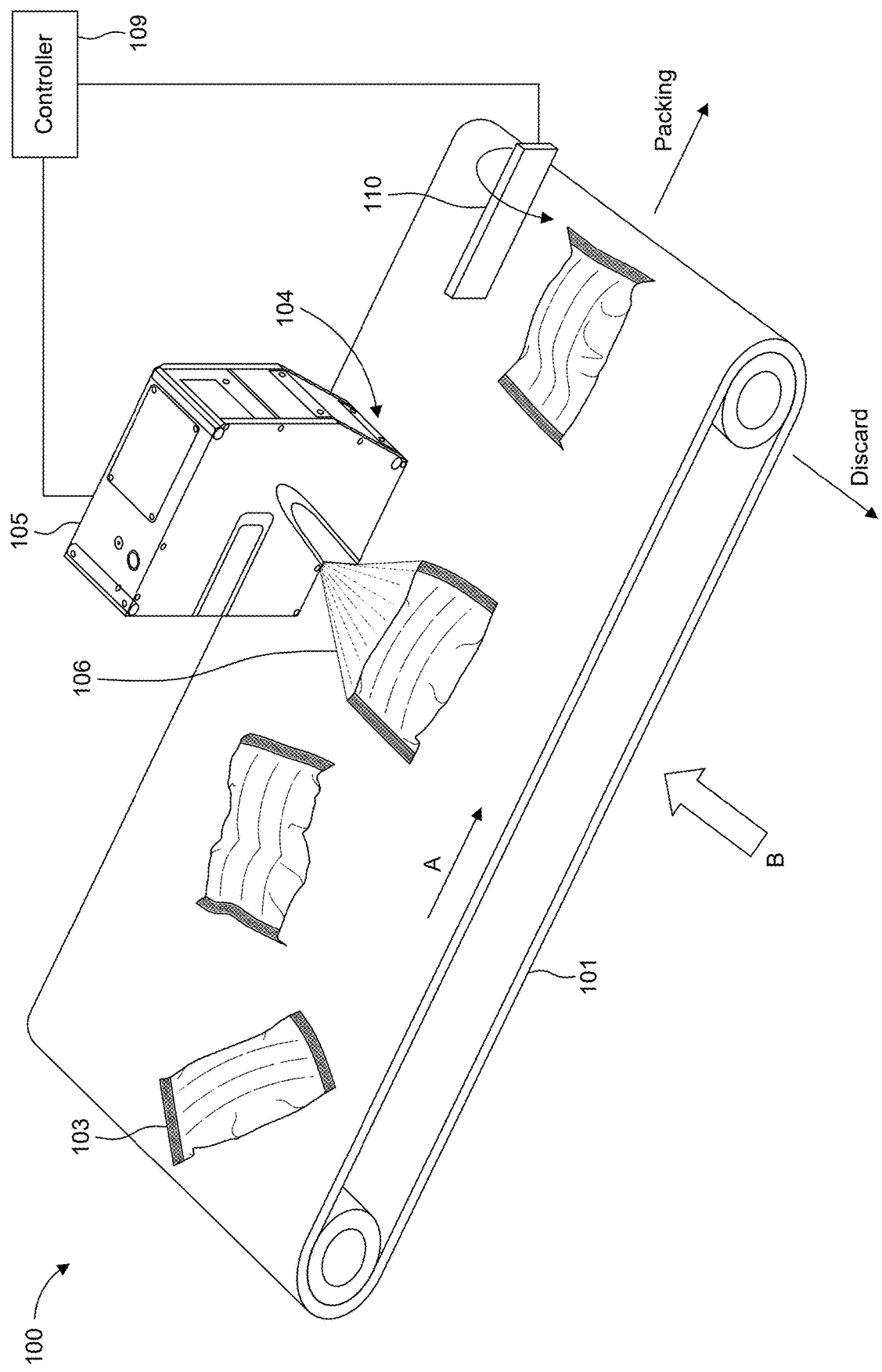
FIG. 1A is a schematic overview showing one example embodiment of an inspection and sorting apparatus according to the description herein, demonstrating machine-assisted inspection of sealable bags by obtaining a depth map of the upper surface of the sealable bag.

FIG. 1A is a schematic overview showing one example embodiment of a testing and sorting apparatus 100 according to the description herein.

As depicted in FIG. 1A, apparatus 100 includes a conveyor 101 configured to convey sealable bags 103 in the direction of arrow A past an inspection station indicated generally at 106. Scanner 105 is positioned at the inspection station and is configured for contactless scanning of one of the surfaces of bag 103, here, the upper surface of bag 103. More specifically, scanner 105 contactlessly obtains multiple scan lines by scanning at 106 of the upper surface of bag 103 as the bag moves through the inspection station, so as to obtain a depth map of the surface of the sealable bag which describes a surface profile topology of the scanned surface. Based on the depth map/surface profile, controller 109 determines whether the seal on sealable bag 103 is or is not intact. Discard mechanism 110 is activated under control of controller 109 to move a bag to a discard station in the event that the seal of the bag is determined as not intact. In this embodiment, discard mechanism 110 is depicted as a flapper arm, but other forms of discard mechanisms may be used, such as an air puff device that use a blasts of air to move bags to the discard station. If the seal is determined to be intact, the bag is sorted to a packing station.

The term "controller" refers to a component configured to interact with and at least partially command operation of various components including, but not limited to conveyor 101, scanner 105 and discard mechanism 110. The controller commands operation of various components at least in part based on information received from the various components. In some embodiments, the controller comprises a processor and/or a software component.

In one embodiment, scanner 105 is a surface height profiler using a laser light curtain to measure surface height relative to a definable reference plane across multiple scan lines as bag 103 advances through inspection station 106. In one example, scanner 105 may be an LJ-X8000 Series Laser Profiler available from Keyence Corporation of America, which performs 2D/3D measurements and inspections of the surface shape of objects in line with conveyance of the object. The LJ-X8000 has a resolution of 3200 points per surface profile, and thus has adequate resolution for Z-direction vertical distance measurements of the surface profile and shape of the bag. However, in other embodiments, it should be understood that other scanners may be used for contactless measurement of the surface profile of bag 103 as it passes through the inspection station, such as contactless scanners that rely on light, lidar, patterned light, sonar, acoustic, radar, and so forth, to obtain a Z-direction vertical distance depth map having multiple measurement points signifying surface profile topology of the scanned surface of bag 103 without contacting to the bag. The depth map has a resolution adequate to discern ridges in the seal area of the bag, such as 3200 point per profile. The depth map may be obtained in a single capture of the entirety of the surface of the bag, or in sequential scan lines as the bag is conveyed past the inspection station.

It is expected that the bags arrive at the inspection station in a disorganized state, without adjustments to obtain regularized alignment, surface shaping, orientation or spacing, as suggested by the depiction in FIG. 1A. More particularly, the bags conveyed past the inspection station typically are unshaped prior to being conveyed past the inspection station, and typically arrive at the inspection station in random (arbitrary) alignments and orientations and spacings. It will be understood that additional devices may be positioned along conveyor 101 so as to obtain a more regularized appearance, if desired, but such devices tend to increase cost of the apparatus.

Figure 1B:
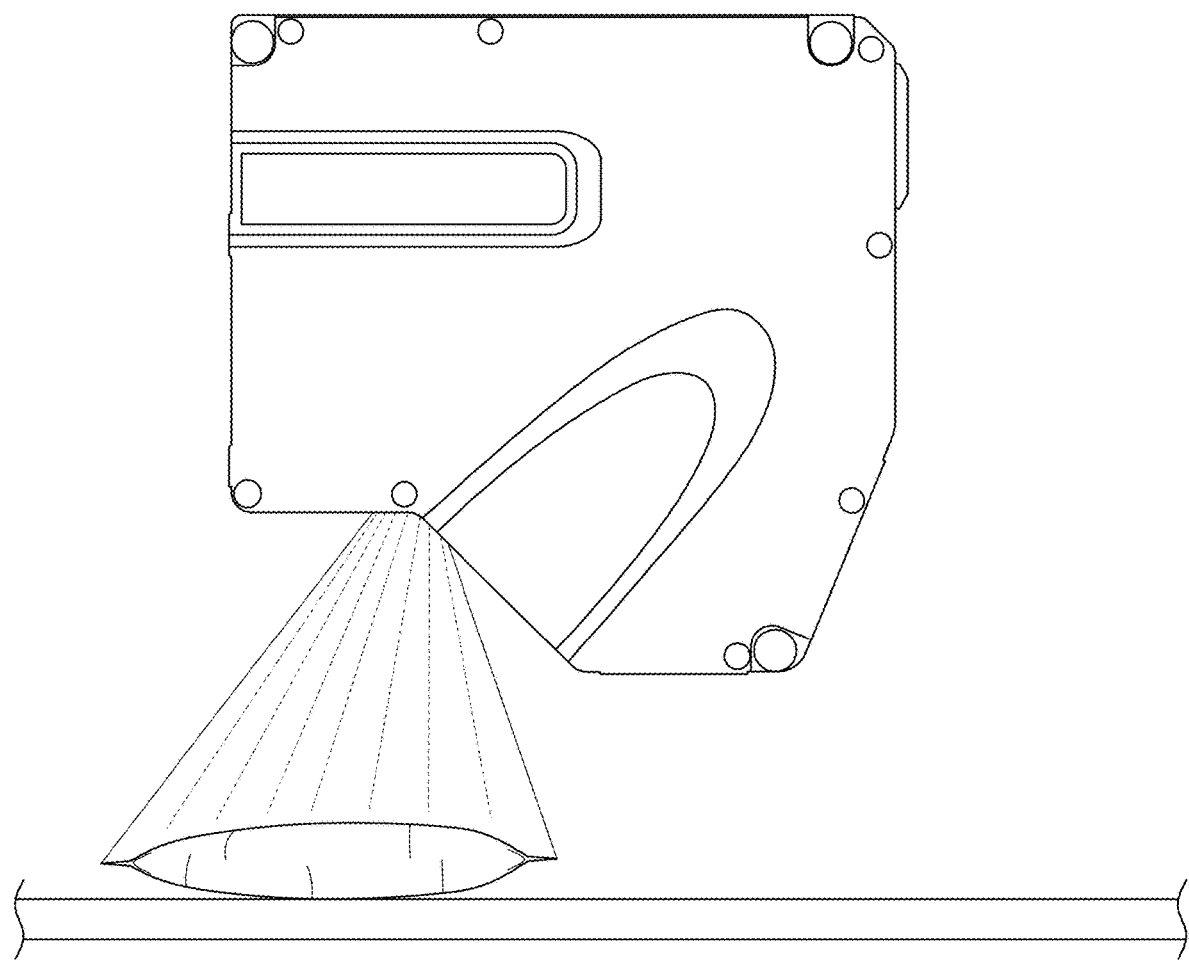
FIGS. 1B and 1C are views showing the field of view for the scanner of FIG. 1A, in the direction of arrow B and the direction orthogonal to arrow B, respectively.
Figure 1C:
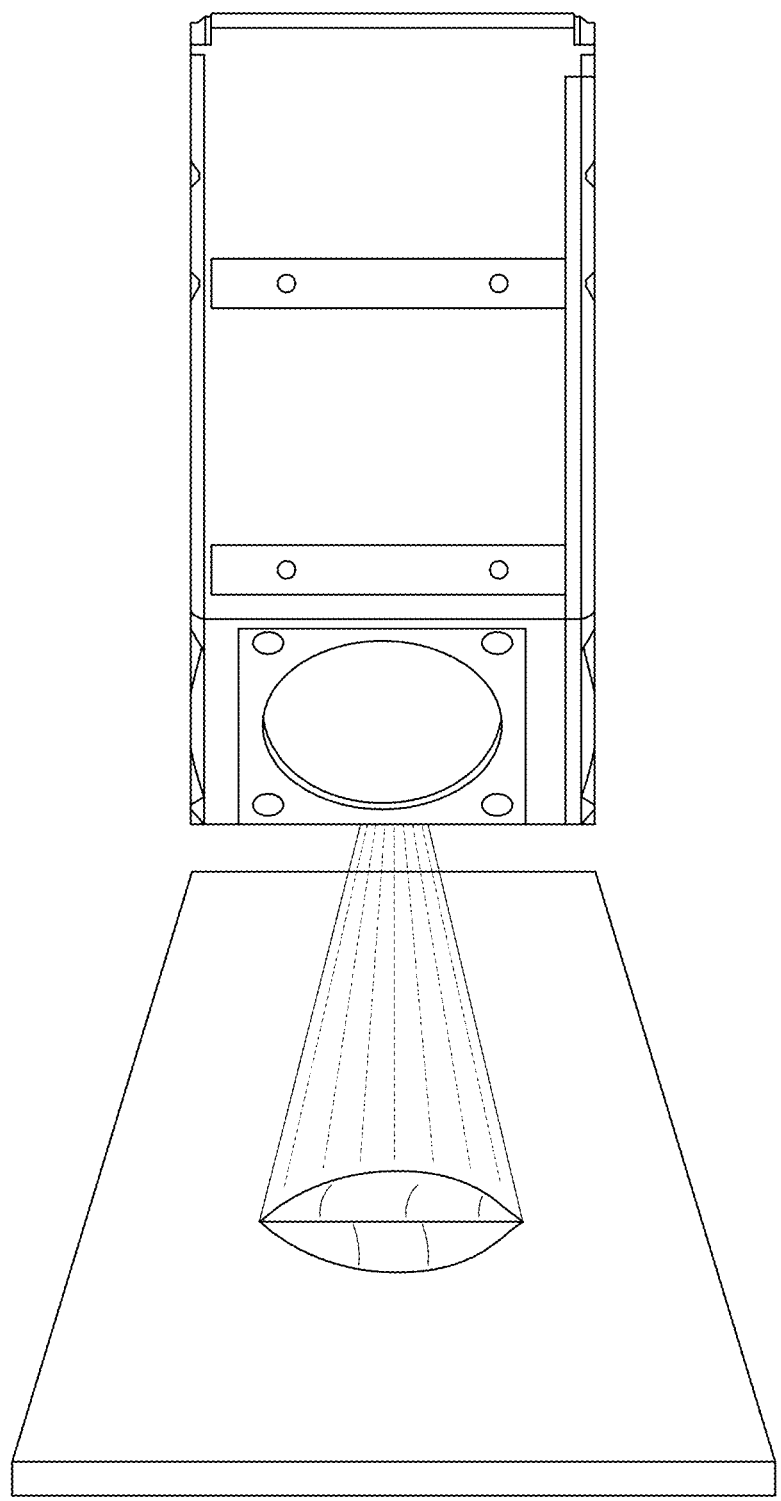

FIGS. 1B and 1C are views showing the field of view for scanner 105 in the direction of arrow B (of FIG. 1A) and in the direction orthogonal to arrow B, respectively.

Figure 2A:
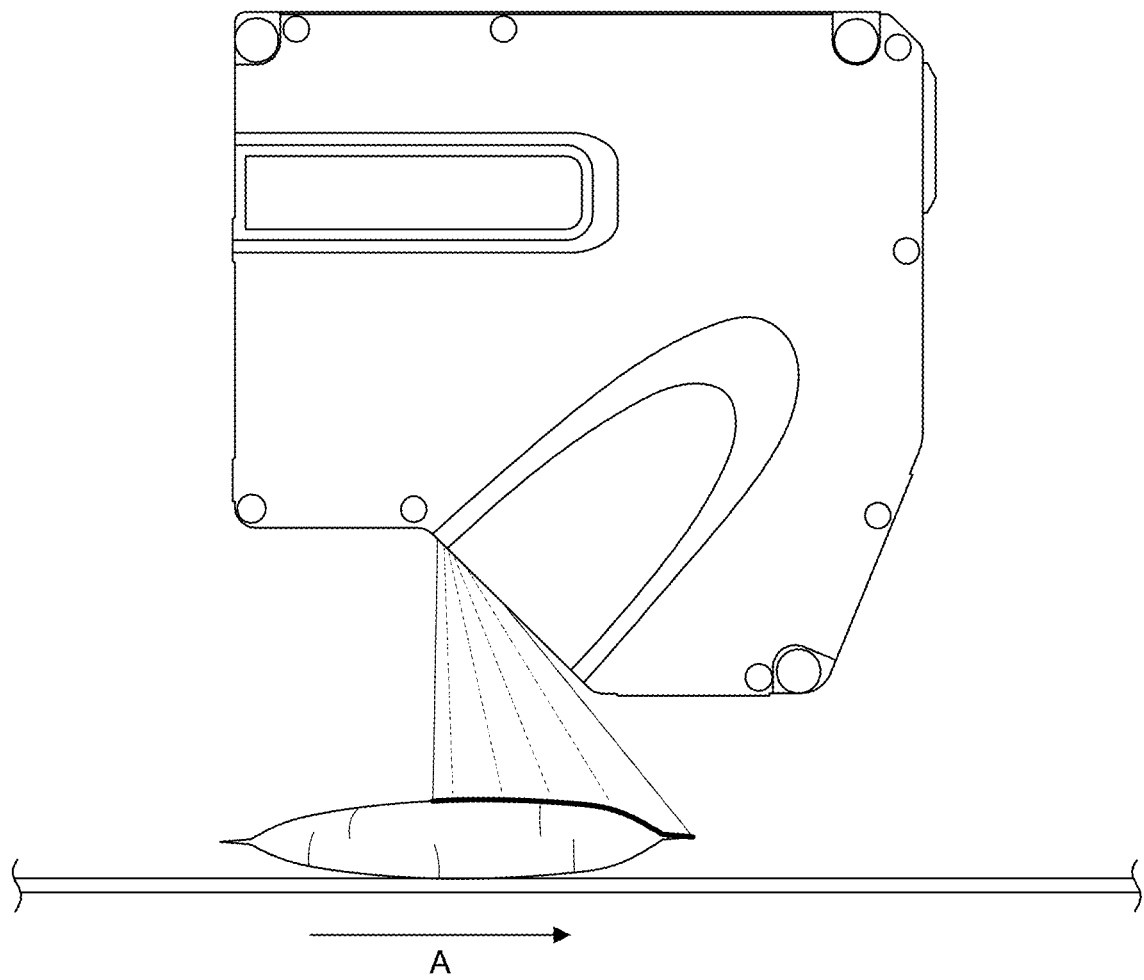
FIGS. 2A and 2B are examples of a properly sealed bag and an inadequately sealed bag, respectively.
Figure 2B:
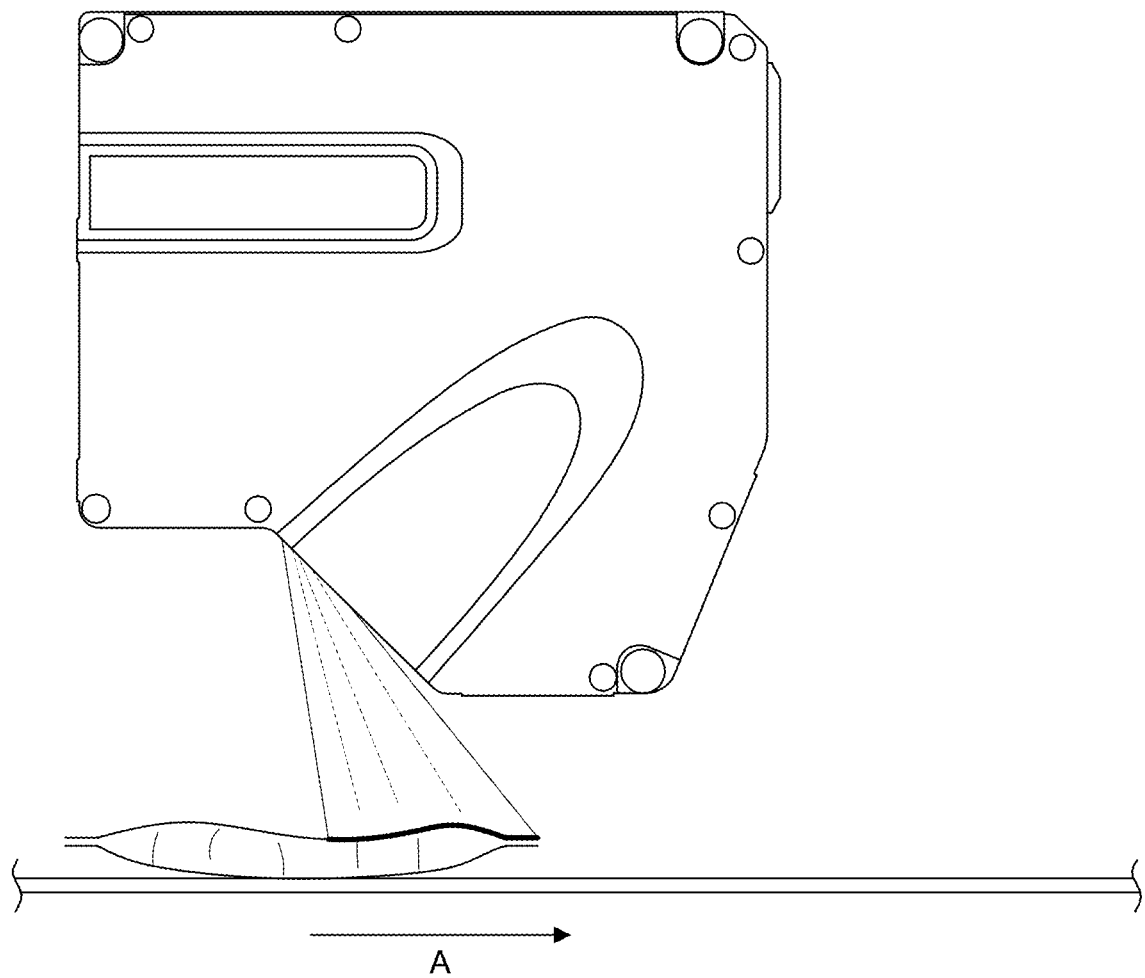

FIGS. 2A and 2B are examples scanning an upper surface of bag 103, taken in the direction of arrow B in FIG. 1A. FIG. 2A depicts a situation where the bag is properly sealed, and is thus fed to the packing station. On the other hand, FIG. 2B depicts a situation where the bag is not properly sealed. Controller 109 determines that the bag is improperly sealed and the bag is thus diverted by discard mechanism 110 (which is not shown in FIG. 2B) to a discard station.

Figure 3A:
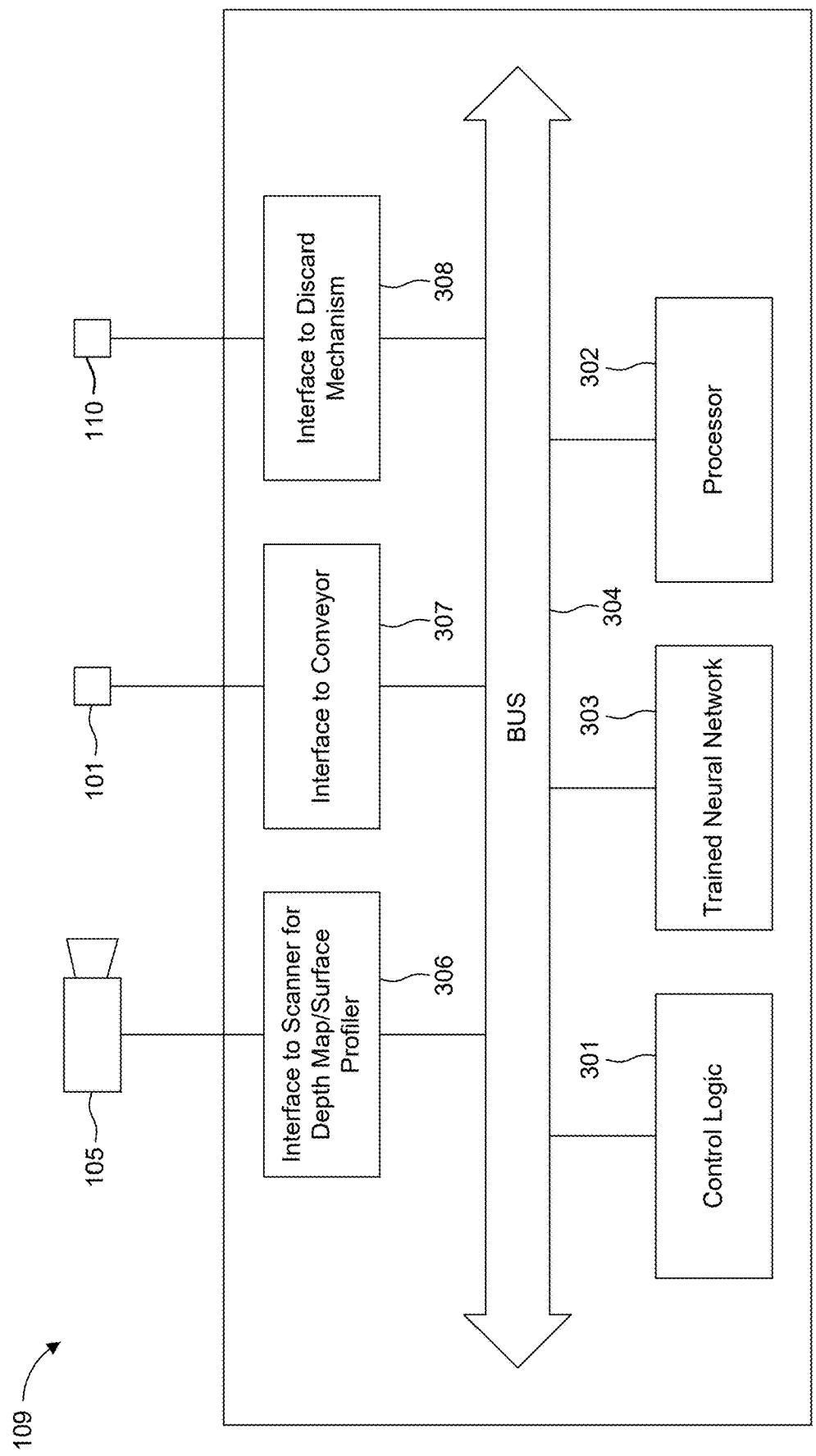
FIG. 3A is a block diagram of controller circuitry according to an embodiment of the disclosure herein.

FIG. 3A is a block diagram of circuitry for controller 109 according to an embodiment of the disclosure herein. The controller may be implemented as one or more processors executing instructions stored in a non-transitory memory, and having interfaces as described herein, for achieving the processes herein described.

In more detail, as shown in FIG. 3A, controller 109 includes control logic 301 and processor 302 connected to bus 304. Control logic 301 comprises computer-executable instructions stored in a memory for execution by processor 302 but in other embodiments the control logic may be hardwired. Also connected to bus 304 are interfaces 306, 307 and 308. Interface 306 interfaces to scanner 105 so as to receive the depth map/surface profile of bag 103 at the inspection station. Interface 307 interfaces to conveyor 101 for actuation of the conveyor. Interface 308 interfaces to discard mechanism 110. Under control of the control logic 301 and processor 302, controller 109 operates system 100 to convey a sealable bag past inspection station 106, to operate scanner 105 so as to cause the scanner to develop a depth map describing a surface profile topology of the scanned surface of the bag, to receive the depth map and use it to determine whether the seal on the sealable bag is or is not intact, to package bags tested as correctly sealed into a packaging material, and to discard bags tested as unsealed.

Controller 109 further includes a trained neural network, depicted as block 303 but typically implemented as instructions stored in a non-transitory memory and executed by processor 302. In general, neural network provides a classification output from the input of the depth map signifying whether the seal on the sealable bag is or is not intact. Training of the neural network is described below.

Neural network 303, which may be a deep learning neural network, is configured with an input layer, one or more hidden layers, and an output layer. The input layer is configured to accept depth maps, and the output layer provides a classification output signifying whether the seal on the sealable bag is or is not intact. For neural network 303, some embodiments use a convolutional neural network having hidden layers that comprise a cascaded sequence of feature maps, due to the disorganized state in which bags arrive at the inspection station. Convolutional neural networks tend to be shift-invariant and are thus more tolerant of the disorganized state of the bags. These networks are not particularly tolerant to variations in rotation and scale, but these variations can be accommodated during training, such as by training on geometrical manipulations of labelled depth maps so as to simulate rotational and scale variations of the labelled depth maps.

Convolutional neural networks are conventionally used for image classification based on an input of an image, but convolutional neural networks are not generally known for use in processing of depth maps.

In some embodiments, neural network 303 is further configured to accept one or more additional feature vector(s) derived from the depth map of the scanned surface of the sealable bag. As one example, the additional feature vector comprises a volume of the bag as calculated from the depth map. Such a calculation is described in co-pending U.S. application Ser. No. 17/671,131 filed Feb. 14, 2022, "Automated Sorting of Sealable Bags", the contents of which are incorporated by reference herein as if set forth in full.

Figure 3B:
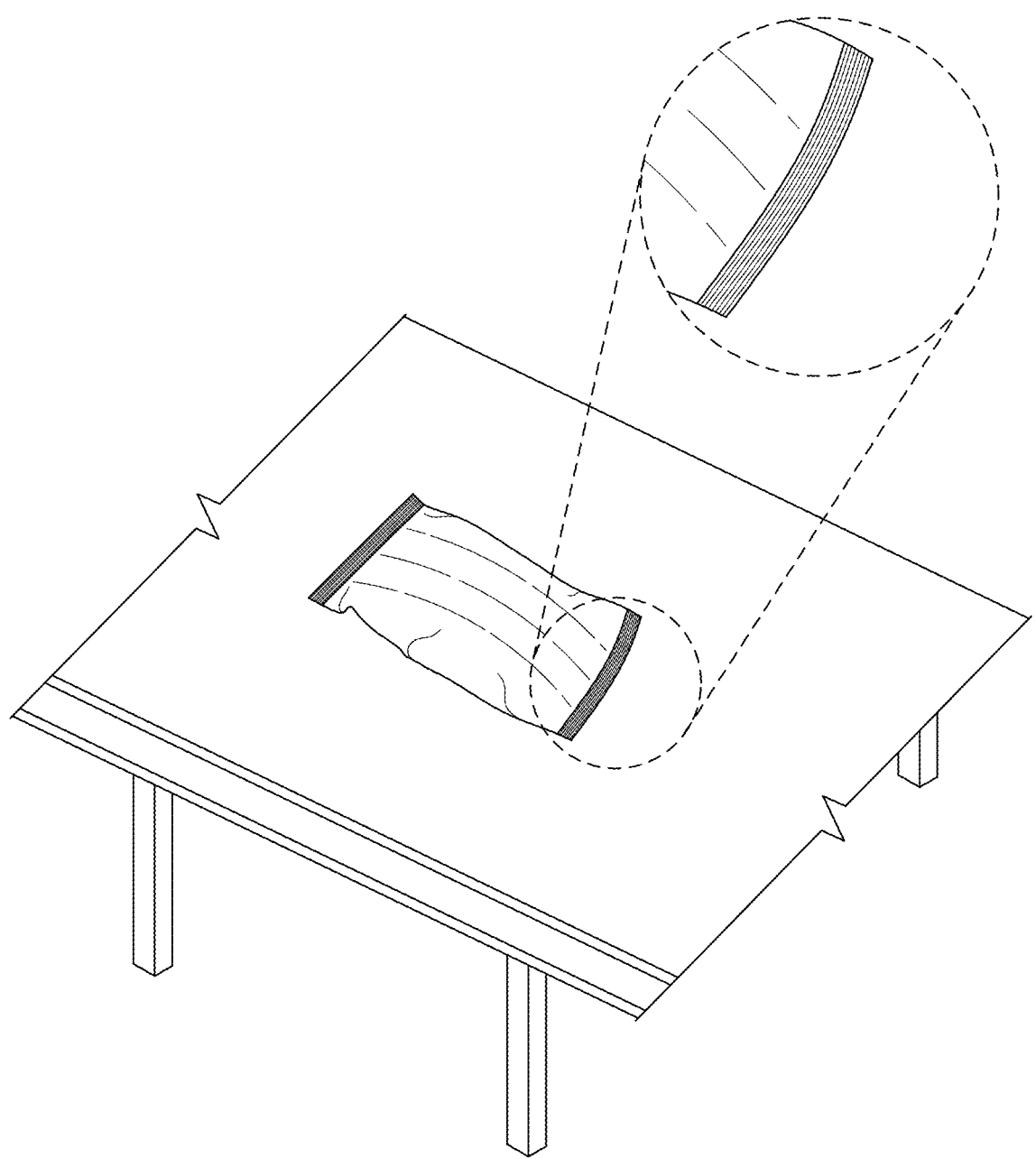
FIGS. 3B to 3F depict some of the variations in the seal area that may be encountered while inspecting bags.

A further example of an additional feature vector involves the seal area of the bag. The seal area of a bag is typically characterized by a series of ridges that extend in parallel across the seal area, usually in the width-wise direction of the bag, as depicted in FIG. 3B. These ridges have vertical heights that are reflected in the depth map of the surface of the bag.

FIGS. 3B to 3F depict some of the variations in the seal area that may be encountered while inspecting bags.

FIG. 3B depicts a properly sealed bag, as mentioned above. Ridges of the seal are smoothly parallel and extend completely across the seal area of the bag. These ridges have vertical heights that are reflected in the depth map of the surface of the bag.

Figure 3C:
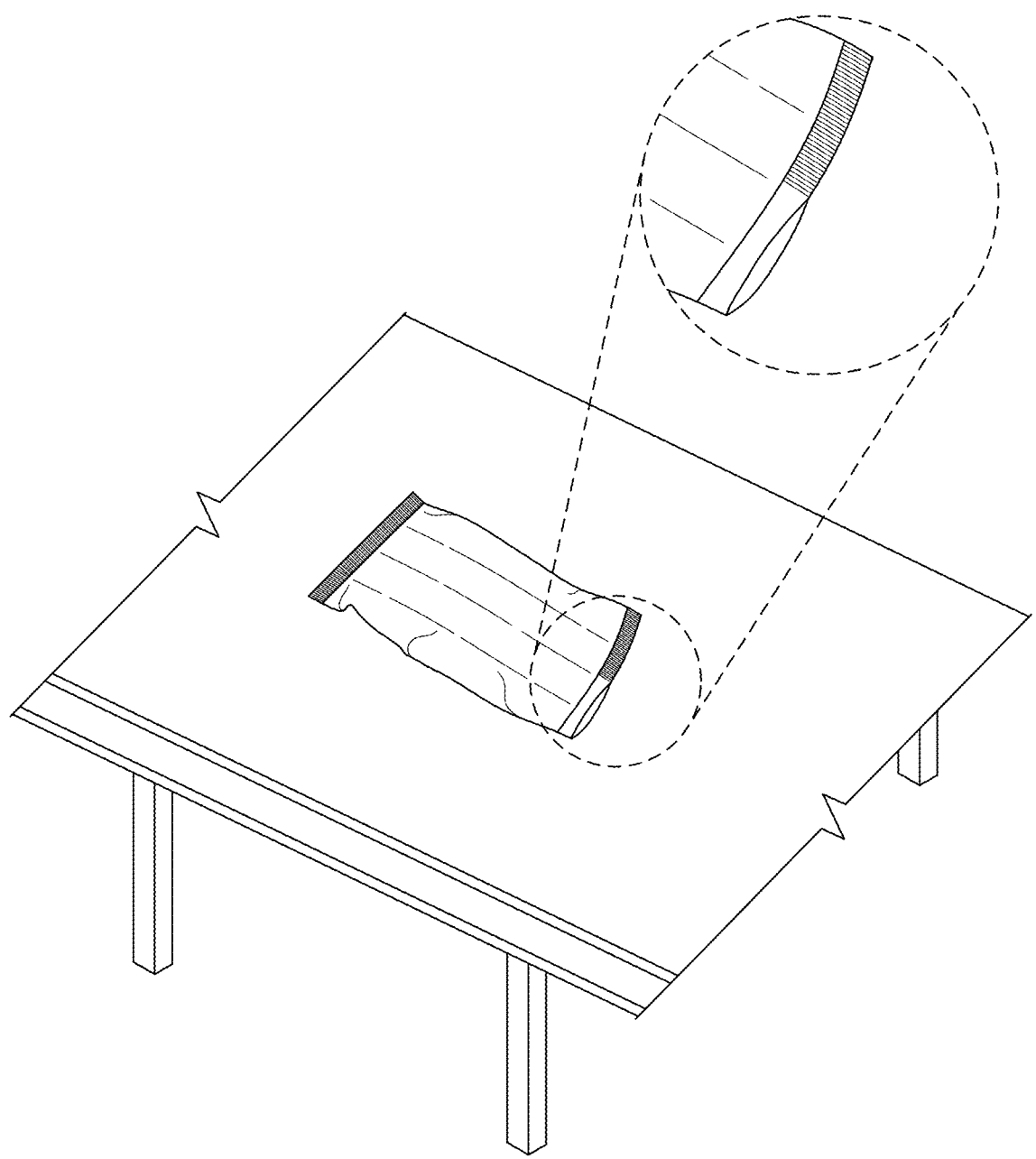

FIG. 3C depicts a poorly sealed bag a bag with an area on it where the seal is completely open. In FIG. 3C the ridges of the seal extend vertically along the length of the bag, that is, perpendicular to the seal area, rather than the width-wise direction depicted in FIG. 3B. These ridges have vertical heights that are reflected in the depth map of the surface of the bag, and training of the neural network 303 allows it to recognize the absence of ridges in part of the seal area.

Figure 3D:
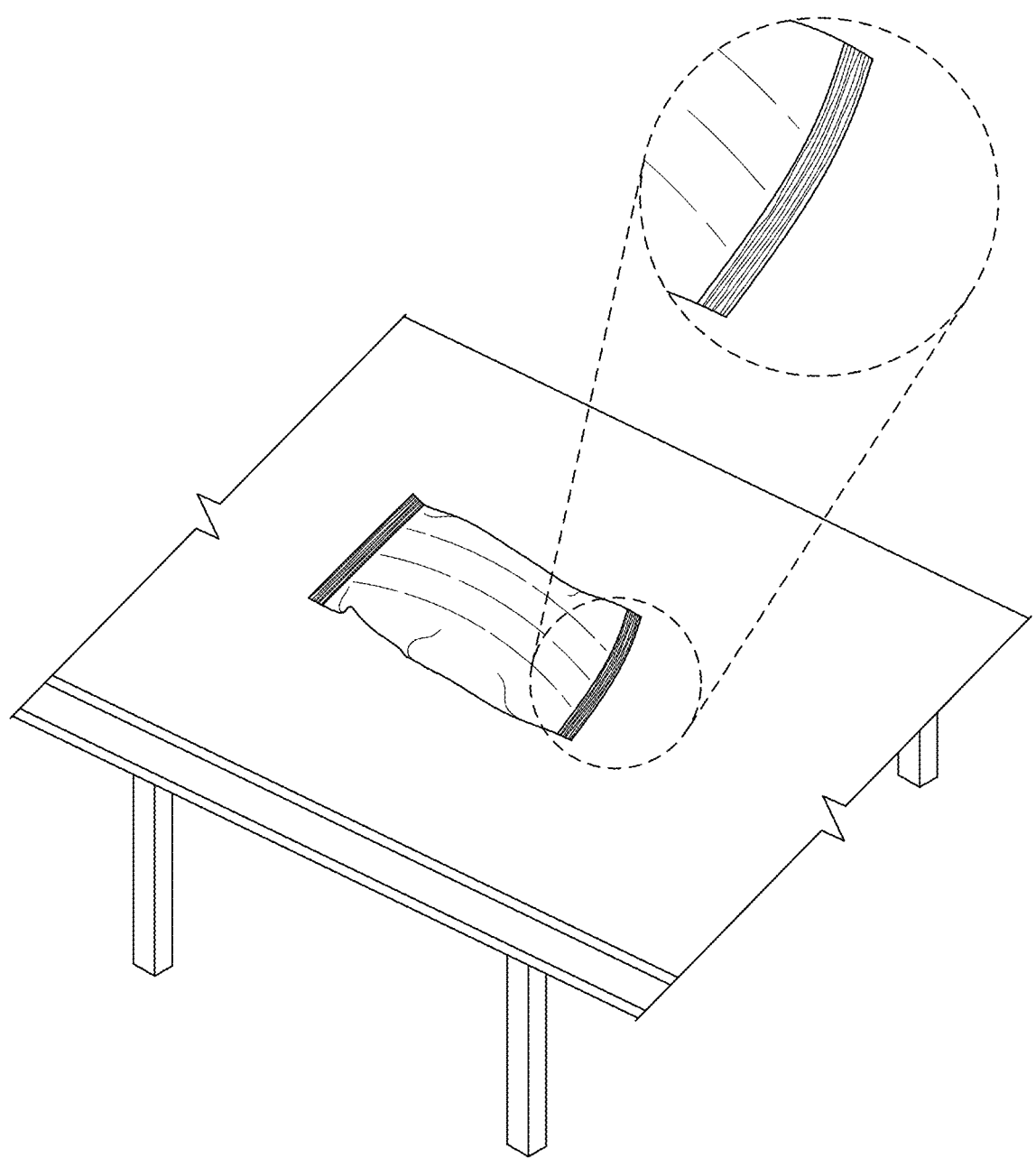

FIG. 3D depicts ridges that are not smoothly parallel and uniform such that the seal is suspect. The seal may in fact be intact, but it nevertheless is of poor quality and prone to failure during packaging and shipment. Neural network 303 may be trained to classify such a seal as defective.

Figure 3E:
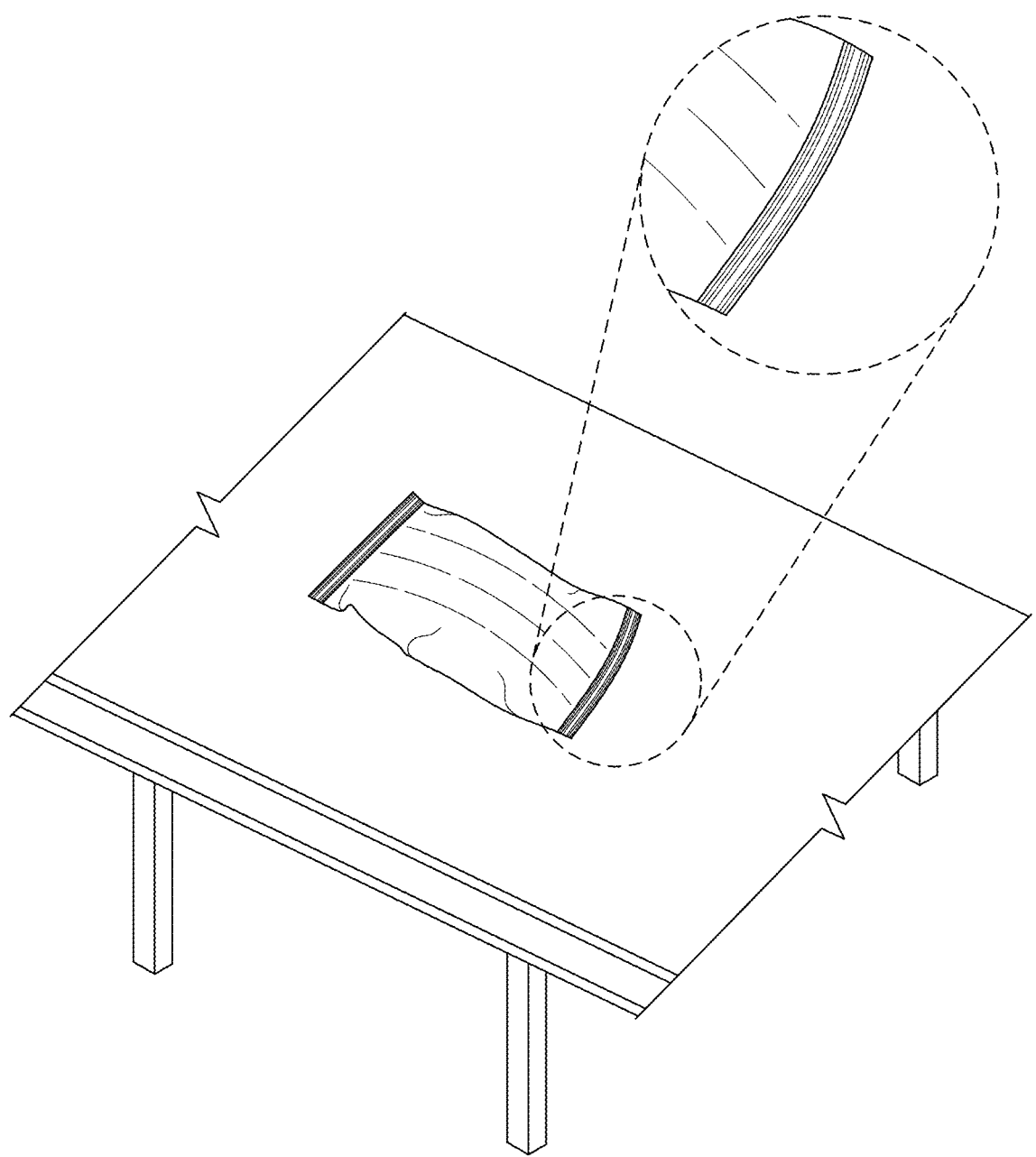

FIG. 3E depicts ridges that are mostly smoothly parallel and uniform but one of the ridges is missing. As in FIG. 3D, such a seal may in fact be intact, but it nevertheless is of poor quality and prone to failure during packaging and shipment. Neural network 303 may be trained to classify such a seal as defective.

Figure 3F:
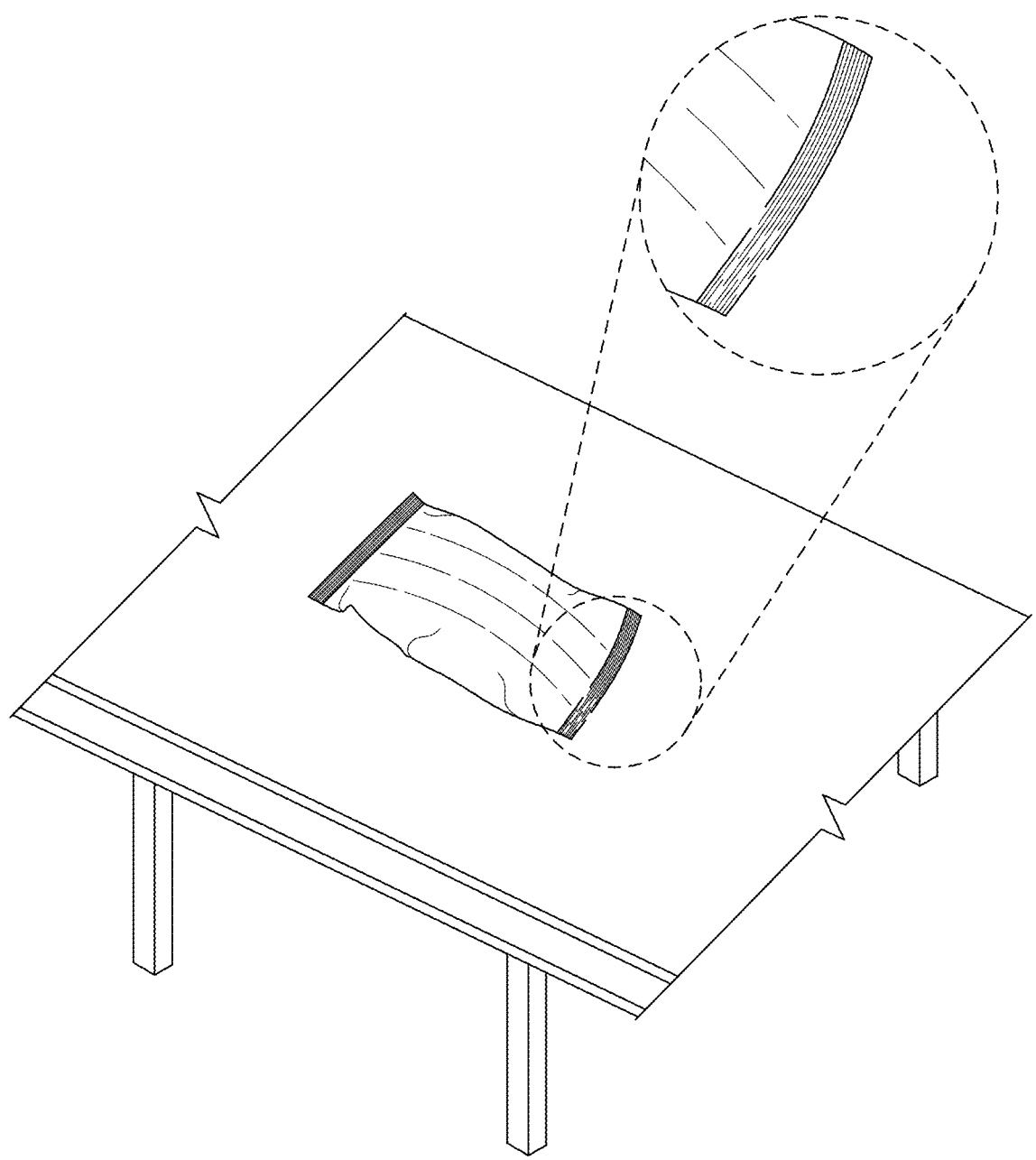

FIG. 3F depicts a seal where ridges are incomplete and form a serpentine path of openings through the seal area to the inside of the bag. Such a seal is defective.

In the context of an additional feature vector provided to neural network 303, controller 21 is operable to extract the seal area from the depth map, to regularize the extracted portion of the depth map by geometric de-rotation and de-skewing of the extracted portion of the seal area, and by providing the de-rotated and de-skewed portion of the depth map for the seal area of the sealable bag to neural network 303.

Prior to providing the de-rotated and de-skewed portion of the depth map for the seal area of the sealable bag to neural network 303, controller 21 may also apply a transformation that emphasizes lines. Stated another way, the transformation interprets ridges in the seal area as lines and emphasizes these lines, such as by application of a Hough transform.

A further example of an additional feature vector comprises an image of the surface of the bag. However, unlike the additional feature vectors described above, an image of the surface of the bag is not derived from the depth map generated by scanner 105, but rather is generated independently by an image capture device controlled by controller 109.

It will be understood that combinations of multiple ones of the above feature vectors may be implemented, and that the neural network is trained using these feature vectors.

Figure 4A:
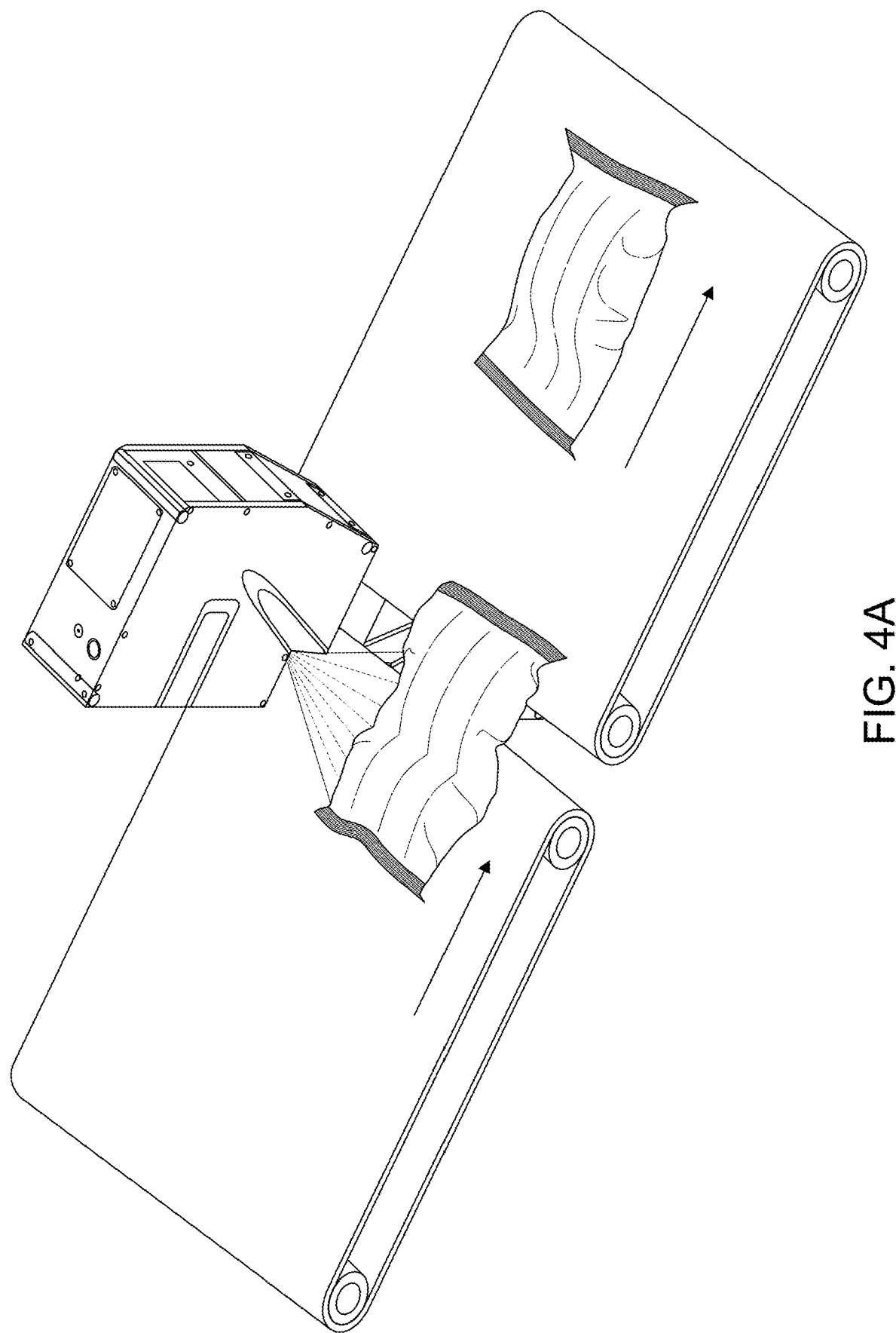
FIGS. 4A and 4B are schematic views showing another example embodiment of an inspection and sorting apparatus according to the description herein, in which both upper and lower surfaces of the bag are scanned.
Figure 4B:
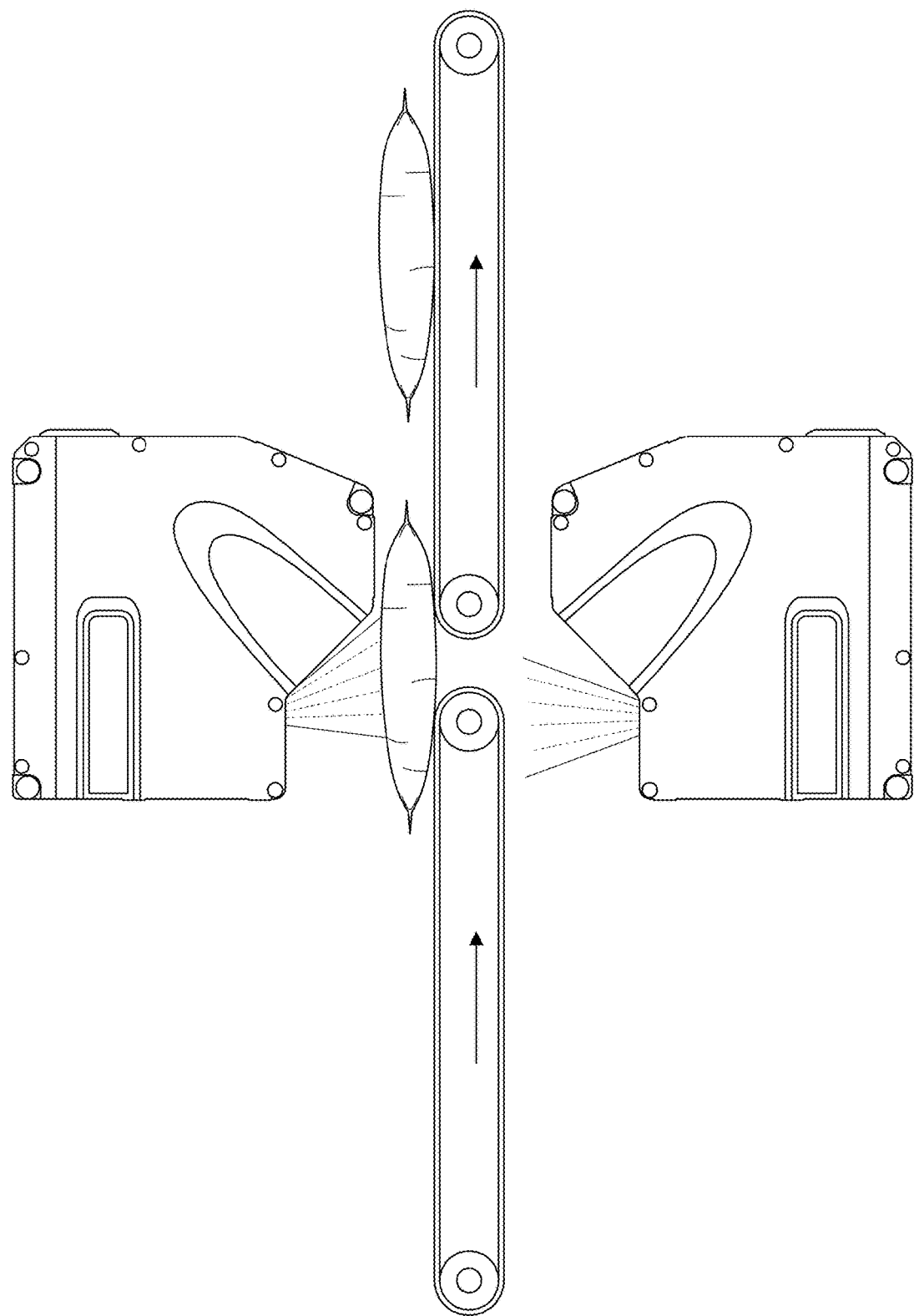

FIGS. 4A and 4B are schematic views showing another example embodiment of a sorting apparatus 100 according to the description herein, in which both upper and lower surfaces of the bag are scanned.

As depicted in FIGS. 4A and 4B, the sorting apparatus includes a tandem pair of conveyors arranged upstream and downstream with respect to each other, with a narrow gap 104a therebetween. A pair of scanners 105a and 105b are arranged above and below the gap, respectively, to allow scanning of both the upper and lower surfaces of bag 103. Here, the scanners are arranged directly over the gap to allow simultaneous scanning of the upper and lower surfaces, but it will be understood that scanner 105a can be positioned upstream or downstream of the gap so as to scan the upper surface before or after scanning by scanner 105b. The gap is sufficiently narrow to allow the bags to pass from the upper conveyor to the lower conveyor without dropping through the gap, and is sufficiently wide to allow scanning of the lower surface by scanner 105b.

In this embodiment, each of the scanners provides a depth map for the scanned surface to controller 109, in which neural network 303 has been trained to accept both upper and lower depth maps as its as input.

Figure 4C:
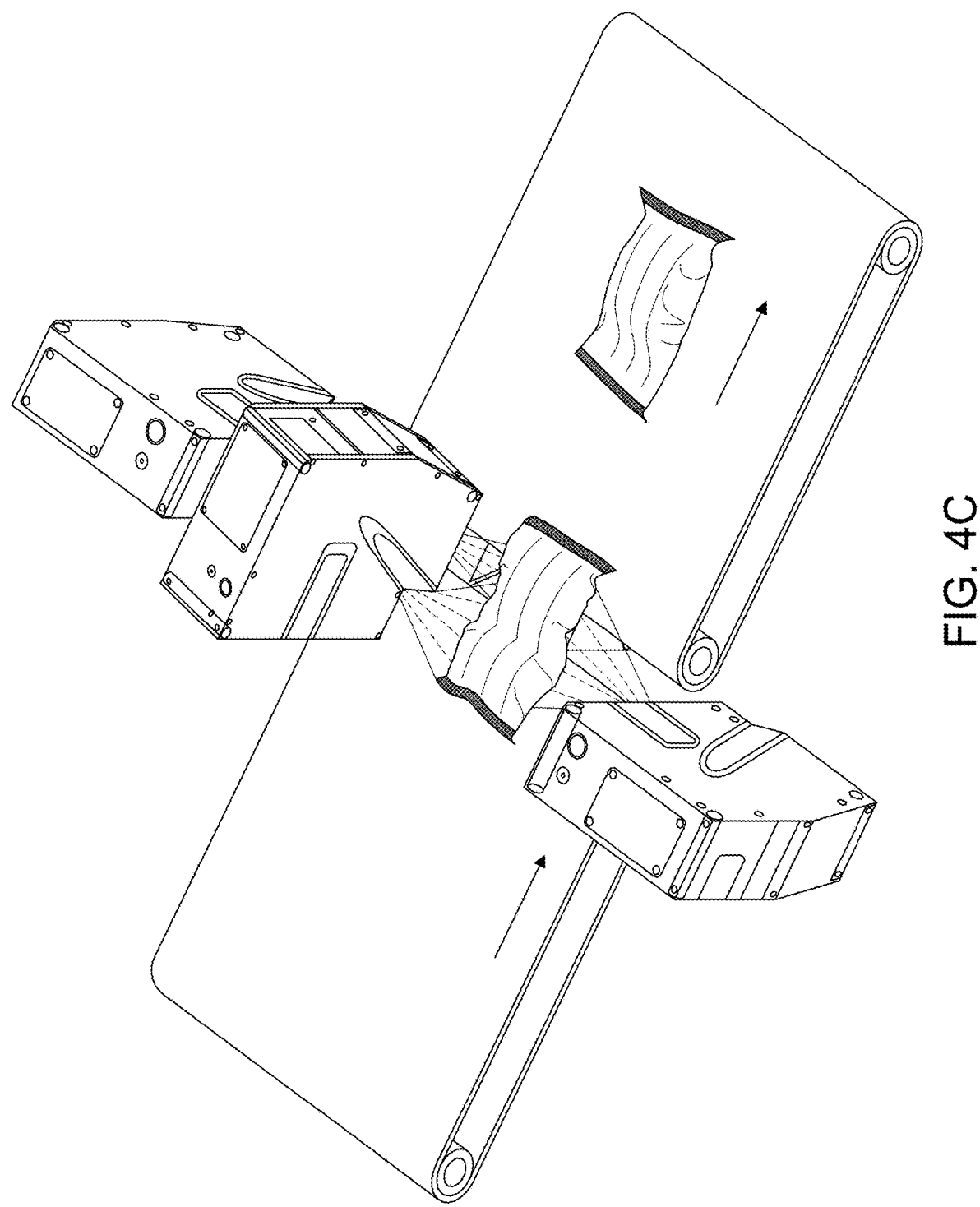
FIGS. 4C and 4D are schematic views showing another example embodiment of an inspection and sorting apparatus according to the description herein, in which all four surfaces of the bag are scanned
Figure 4D:
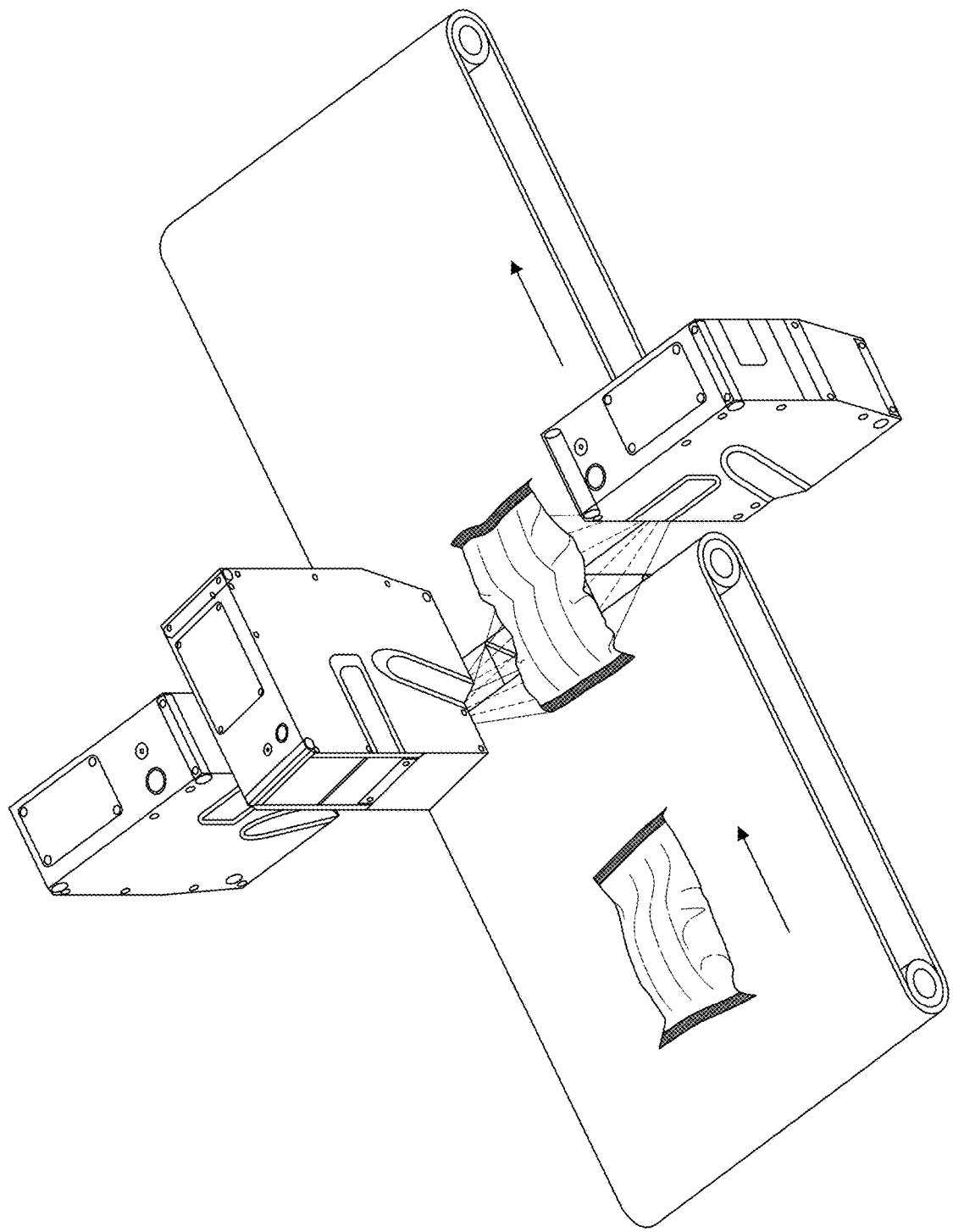

FIGS. 4C and 4D are schematic views showing another example embodiment of a sorting apparatus 100 according to the description herein, in which all four surfaces of the bag are scanned, i.e., top, bottom, left and right. In similarity to the arrangement in the embodiment of FIGS. 4A and 4B, each of the scanners provides a depth map for the scanned surface to controller 109, in which neural network 303 has been trained to accept all four depth maps as its as input.

Training

Neural network 303 is trained on data using methods known to those of ordinary skill, such as gradient descent, resilient backpropagation, conjugate gradient, quasi-Newton, and Levenberg-Marquardt. The data by which the network is trained matches the input characteristics expected during operation, i.e., matches the dimensions of the depth maps provided by scanner 105 and matches any of the additional feature vectors provided by controller 109.

In some embodiments, the trained neural network is trained on labelled depth maps of plural scanned bags and is further trained on geometrical manipulations of the labelled depth maps so as to simulate rotational and scale variations of the labelled depth maps. This is particularly useful in the case of a convolutional neural network, which tend to be shift-invariant and are thus more tolerant of the disorganized state of the bags at the inspection station, but which are not particularly tolerant to variations in rotation and scale. By training on geometrical manipulations of labelled depth maps so as to simulate rotational and scale variations of the labelled depth maps, variations in rotation and scale can be trained into the neural network which is thus able to generalize more easily.

In some embodiments, the trained neural network is trained for abnormality detection. Abnormality detection is useful when normal samples of bags properly sealed with integrity are abundant, but abnormal samples of improperly sealed bags are rare. As used herein, abnormality detection includes one or both of novelty detection and outlier detection. In novelty detection, the training data consists of sealed bags only, and is not polluted by outliers (i.e., improperly sealed bags); the resulting neural network is thus trained to detecting whether a new observation is a novelty/outlier. In outlier detection, the training data mostly contains properly sealed bags with some outliers of improperly sealed bags which deviate from the norm; the resulting neural network is thus trained to fit the regions where the training data is the most concentrated and to ignore the deviant observations.

Method

An embodiment of the instant disclosure herein relates to a machine-assisted determination of whether a sealable bag is or is not properly sealed, wherein a surface or surfaces of the sealable bag is contactlessly scanned as the sealable bag is conveyed past an inspection station so as to obtain a depth map describing a surface profile topology of the scanned surface. The depth map of the scanned surface of the sealable bag is provided to the input layer of a trained neural network so as to obtain a classification output from the neural network signifying whether the seal on the sealable bag is or is not intact. The sealable bag is sorted to a discard station responsive to a classification output that signifies that the seal on the sealable bag is not intact and is sorted to a packaging station responsive to a classification output that signifies that the seal on the sealable bag is intact.

In describing embodiments of the disclosure herein, specific terminology is employed for the sake of clarity. However, the disclosure herein is not intended to be limited to the specific terminology so selected. The above-described embodiments of the disclosure herein may be modified or varied, without departing from the disclosure herein, as appreciated by those skilled in the art in light of the above teachings. It is therefore to be understood that, within the scope of the claims and their equivalents, the disclosure herein may be practiced otherwise than as specifically described.

The invention claimed is:

1. An apparatus for automated testing a sealable bag for integrity of the seal, comprising:
   a conveyor configured to convey a sealable bag past an inspection station;
   a surface profile scanner configured and positioned to contactlessly scan a surface of the sealable bag as the sealable bag passes through the inspection station, and to obtain a depth map describing a surface profile topology of the scanned surface;
   a controller including a trained neural network having an input layer configured to accept depth maps, the controller being configured (i) to provide the depth map of the scanned surface of the sealable bag to the input layer of the neural network, and (ii) to obtain a classification output from the neural network signifying whether the seal on the sealable bag is or is not intact; and
   a sorting mechanism,
   wherein the sorting mechanism is controlled by the controller to sort the sealable bag to a discard station responsive to a classification output that signifies that the seal on the sealable bag is not intact,
   wherein the input layer of the neural network is further configured to accept an additional feature vector derived from the depth map describing the surface profile topology of the scanned surface of the sealable bag, and wherein the controller is further configured to calculate the additional feature vector from the depth map of the scanned surface of the sealable bag and to provide the calculated feature vector to the input layer of the neural network, and
   wherein the additional feature vector comprises a transformation of the seal area of the sealable bag, wherein the transformation interprets ridges in the seal area as lines and emphasizes lines.

2. The apparatus according to claim 1, wherein the additional feature vector further comprises a calculated volume of the bag.

3. The apparatus according to claim 1, wherein the additional feature vector further comprises a de-rotated and de-skewed portion of the depth map for the seal area of the sealable bag.

4. The apparatus according to claim 1, wherein the transformation includes a Hough transform.

5. The apparatus according to claim 1, wherein the input layer of the neural network is further configured to accept an additional feature vector comprising an image of the surface of the bag, and wherein the controller is further configured to calculate the additional feature vector from a captured image of surface of the sealable bag and to provide the calculated feature vector to the input layer of the neural network.

6. The apparatus according to claim 1, wherein bags conveyed past the inspection station are unshaped prior to being conveyed past the inspection station.

7. The apparatus according to claim 1, wherein bags conveyed past the inspection station arrive at the inspection station in random (arbitrary) alignments and orientations and spacings.

8. The apparatus according to claim 1, wherein resolution of the depth map is at least 3200 points per surface profile.

9. The apparatus according to claim 1, wherein the trained neural network is comprised of a convolutional neural network having hidden layers that comprise a cascaded sequence of feature maps.

10. The apparatus according to claim 1, wherein the trained neural network is trained on labelled depth maps of plural scanned bags and is further trained on geometrical manipulations of the labelled depth maps so as to simulate rotational and scale variations of the labelled depth maps.

11. The apparatus according to claim 1, wherein the trained neural network is trained for abnormality detection including one or both of novelty detection and outlier detection.

12. A method for automated testing a sealable bag for integrity of the seal, comprising:
   contactlessly scanning a surface of the sealable bag as the sealable bag passes through an inspection station, to obtain a depth map describing a surface profile topology of the scanned surface;
   providing the depth map of the scanned surface of the sealable bag to an input layer of a trained neural network;

obtaining a classification output from the trained neural network signifying whether the seal on the sealable bag is or is not intact; and sorting the sealable bag to a discard station responsive to a classification output that signifies that the seal on the sealable bag is not intact, wherein the input layer of the neural network is configured to accept an additional feature vector derived from the depth map describing the surface profile topology of the scanned surface of the sealable bag, wherein the method further comprises calculating the additional feature vector from the depth map of the scanned surface of the sealable bag and providing the calculated feature vector to the input layer of the neural network, and wherein the additional feature vector comprises a transformation of the seal area of the sealable bag, wherein the transformation interprets ridges in the seal area as lines and emphasizes lines.

13. The method according to claim 12, wherein the additional feature vector further comprises a calculated volume of the bag.

14. The method according to claim 12, wherein the additional feature vector further comprises a de-rotated and de-skewed portion of the depth map for the seal area of the sealable bag.

15. The method according to claim 12, wherein the transformation includes a Hough transform.

16. The method according to claim 12, wherein the input layer of the neural network is further configured to accept an additional feature vector comprising an image of the surface of the bag, wherein the method further comprises calculating the additional feature vector from a captured image of surface of the sealable bag and providing the calculated feature vector to the input layer of the neural network.

17. The method according to claim 12, wherein bags conveyed past the inspection station are unshaped prior to being conveyed past the inspection station.

18. The method according to claim 12, wherein bags conveyed past the inspection station arrive at the inspection station in random (arbitrary) alignments and orientations and spacings.

19. The method according to claim 12, wherein resolution of the depth map is at least 3200 points per surface profile.

20. The method according to claim 12, wherein the trained neural network is comprised of a convolutional neural network having hidden layers that comprise a cascaded sequence of feature maps.

21. The method according to claim 12, wherein the trained neural network is trained on labelled depth maps of plural scanned bags and is further trained on geometrical manipulations of the labelled depth maps so as to simulate rotational and scale variations of the labelled depth maps.

22. The method according to claim 12, wherein the trained neural network is trained for abnormality detection including one or both of novelty detection and outlier detection.

* * * * *